United States Patent [19]

Davies

[11] 3,991,624

[45] Nov. 16, 1976

[54] WIND VELOCITY SERVO SYSTEM

[76] Inventor: Leslie Llewellyn Rhys Davies, 88 Winter St., Lexington, Mass. 02173

[22] Filed: June 6, 1974

[21] Appl. No.: 477,147

[52] U.S. Cl. .................................. 73/189; 73/204
[51] Int. Cl.² ........................................ C01W 1/04
[58] Field of Search .......... 73/188, 189, 204, 170 R; 340/239 R

[56] References Cited
UNITED STATES PATENTS

| 2,736,198 | 2/1956 | Kuhn ................................ 73/188 X |
| 3,352,154 | 11/1967 | Djorup .............................. 73/189 |
| 3,592,055 | 7/1971 | Dorman ............................. 73/188 |
| 3,603,147 | 9/1971 | Dorman ............................. 73/204 |
| 3,604,261 | 9/1971 | Olin .................................. 73/189 |
| 3,677,085 | 7/1972 | Hayakawa .......................... 73/204 |
| 3,686,937 | 8/1972 | Corey ................................ 73/189 |

FOREIGN PATENTS OR APPLICATIONS

| 267,220 | 7/1970 | U.S.S.R. ............................. 73/189 |
| 145,785 | 5/1962 | U.S.S.R. ............................. 73/189 |

OTHER PUBLICATIONS

"Hot Wire Probe Calibration Equations for Air Velocity, Direction and Temperature"; Flow Corporation; Bulletin 11D; Dec., 1964.

Primary Examiner—Richard C. Queisser
Assistant Examiner—John S. Appleman
Attorney, Agent, or Firm—Wolf, Greenfield & Sacks

[57] ABSTRACT

A servo system employs a dual element wind direction sensor mounted on a rotatable support that can be driven in opposite directions by a reversible motor. The sensor employs a pair of closely spaced, elongate, hot wire elements that extend side by side along the sensor's longitudinal axis. The hot wire elements are heated to a temperature that is a fixed amount above the ambient temperature. The two hot wire elements are equally ventilated only when the wind blows directly along the longitudinal axis of the sensor. Because the resistance of the hot wire elements varies with temperature, an unabalance signal is generated when the elements are unequally ventilated by an "off-axis" wind. The unbalance signal causes the motor to turn the rotatable support to the position where the wind is directed along the sensor's longitudinal axis. Consequently the servo system acts to keep the longitudinal axis of the sensor pointed into the wind.

4 Claims, 12 Drawing Figures

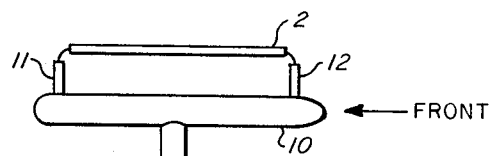
FIG. 1A
FIG. 1
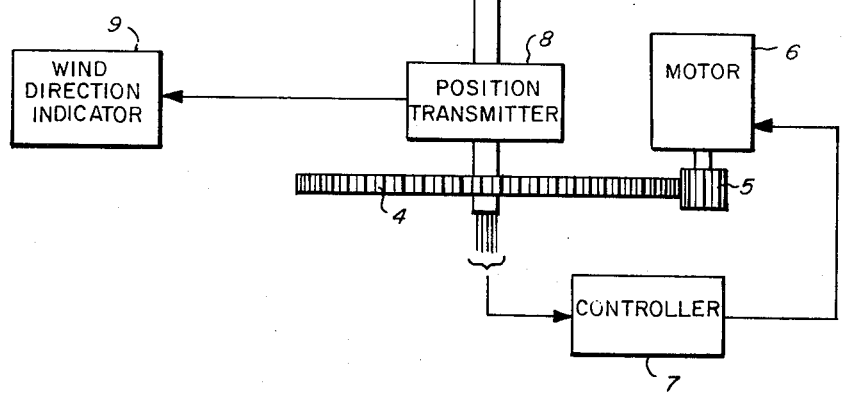
FIG. 2
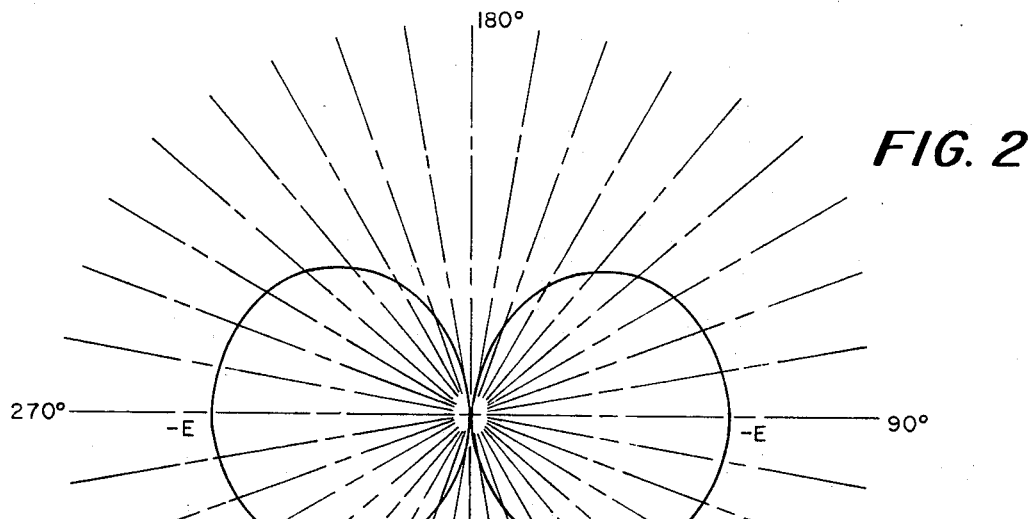
FIG. 2A

SERVO CIRCUIT

WIND SPEED CIRCUIT

180°
AMBIGUITY
DETECTOR

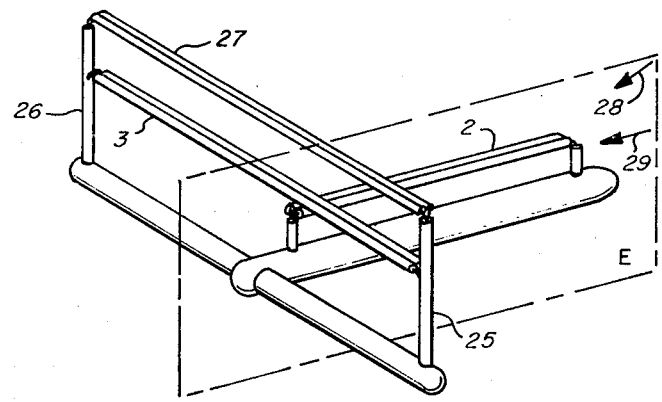
FIG. 8
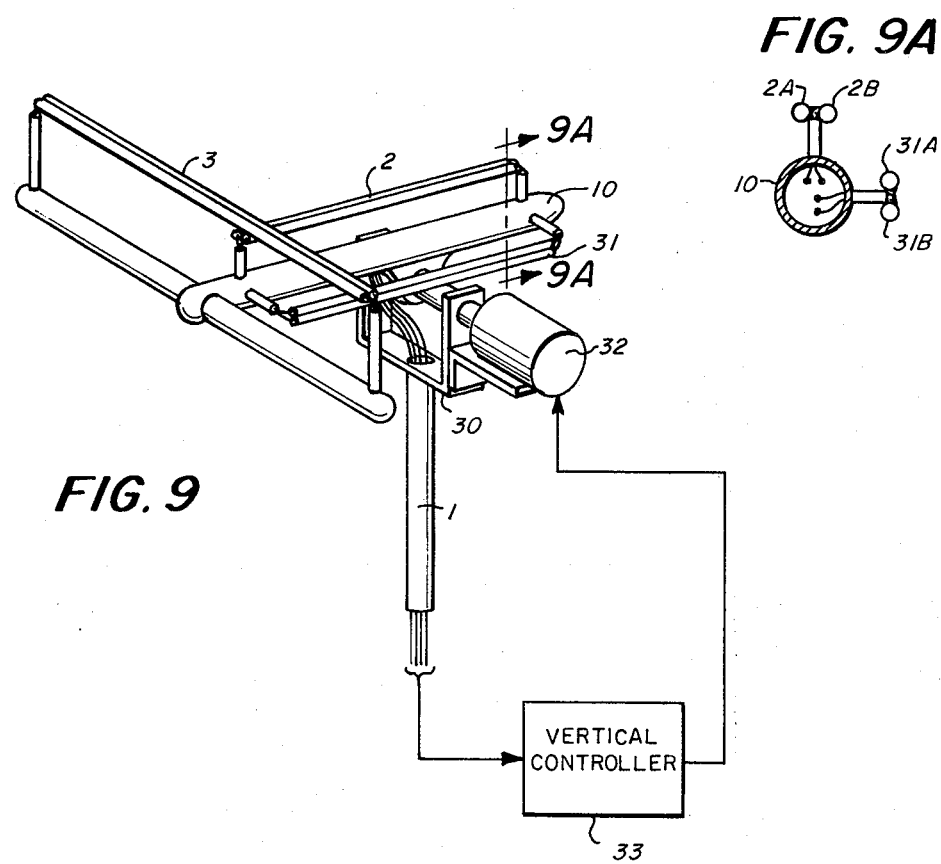
FIG. 9
FIG. 9A

WIND VELOCITY SERVO SYSTEM

This invention relates in general to apparatus for ascertaining the direction of the wind and measuring the wind's speed. More particularly, the invention pertains to a system having a wind direction probe which is driven by a servomotor to a null position to cause the aspect which a velocity sensor presents to the wind to be held substantially constant despite changes in wind direction.

In conventional constant current "hot-wire" anemometer systems, the sensing element is a fine wire of platinum or tungsten which is electrically heated by a constant current to a temperature in excess of that of the surrounding fluid. The hot wire is usually employed as one arm of a Wheatstone bridge inasmuch as a change in wire temperature causes a change in wire resistance. To accurately reproduce fluctuations greater than about 100 Hz, it is necessary to provide compensation for the thermal lag of the wire. Usually, the output of the wire is fed into an amplifier which provides the correct compensation.

The constant current anemometer system has been substantially superceded by the more sophisticatd current feedback, constant temperature anemometer system. In the constant temperature system, an unbalance in the Wheatstone bridge resulting from a change in resistance of the hot wire causes a current to be fed back to the wire which restores the wire to the resistance needed to bring the bridge again into balance. The system operates to hold the wire's resistance constant and so maintains a constant wire temperature regardless of the amount of heat convected away from the wire. When the wire is held at a constant temperature, no thermal lag occurs and the feedback current serves as the measure of the fluctuation in heat convection.

In the usual hot wire anemometer the diameter of the wire is between 0.00001 and 0.001 in. and consequently is subject to breakage under shock or stress. An alternative to the thin hot wire anemometer is the hot film anemometer which employs a thin metal film coating, usually of platinum, upon an insulative substrate. The thin film is heated by the passage through it of an electric current or by an adjacent heater and, in effect, the heated thin film replaces the slender hot wire.

The hot wire anemometer is sensitive to the aspect which it presents to a flowing fluid. For example, a fluid flowing longitudinally along the hot wire carries away less heat then the same fluid flowing at the same speed transversely across the hot wire. Some hot wire transducers are characterized by a cosine response. That is, assuming the same fluid flows at a constant velocity relative to the hot wire, and assuming the hot wire is employed in a constant temperature system and is initially oriented to have the fluid flow longitudinally along the wire, rotation of the wire which constantly changes the aspect of the wire presented to the flowing fluid causes the feedback current to vary in direct relation to the cosine of the angle through which the wire is turned. However, the direction of rotation, whether clockwise or counterclockwise cannot be ascertained from the signal, because the response is the same for either direction.

In hot wire anemometer systems where the direction of fluid flow is fixed relative to the hot wire as by confining the flow longitudinally along a tube, the hot wire presents an unchanging aspect to the flowing fluid so that the angular response of the wire is of no consequence. In contrast, in those systems where the orientation of the hot wire relative to the direction of fluid flow is not fixed, the system, to be accurate, must be calibrated to compensate for the angular response of the hot wire. The calibrated system must, in some manner, ascertain the angular relation between the hot wire and the direction of fluid flow.

The invention relates to a hot wire anemometer system in which the velocity sensor is driven by a servo system so that the velocity sensor always presents the same aspect to the flowing fluid. The system is primarily intended to ascertain the direction of the wind and measure wind speed. The system can, of course, be used generally to ascertain the direction and speed of any flowing fluid where the disposition of a heated element in the flowing stream can be tolerated. To sense the direction of wind, the invention employs a dual element sensor having a pair of hot wires which are preferably arranged side by side with the gap between the wires closed by a filler. The signals from the two hot wires of the dual element sensor are utilized to obtain a difference signal which actuates a servo motor in the system. The system drives the dual element sensor to a "null" position where the wind flows longitudinally along the wires to ventilate those wires. A small change in the angle of ventilation results in an appreciable difference signal so that the system can respond rapidly to changes in wind direction. The same dual element sensor can be used to obtain the speed of the wind by deriving a signal from those elements that is a measure of the heat carried off by the flowing air. However, because optimum sensitivity to wind speed occurs when the wind flows transversely across the sensor rather than longitudinally along the sensor, it is preferred, for precision, to use a separate wind speed sensor that is positioned perpendicularly to the direction sensor. In the more precise arrangement, the wind speed sensor is mounted to be driven with the dual element sensor whereby the wind speed sensor presents a known aspect to the wind in the null position. To obviate the 180° ambiguity that may arise because the dual element sensor can be ventilated along its length in directly opposite directions, another sensor may be employed to prevent the wind direction sensor from assuming a position 180° opposite the correct null position.

The invention provides a system that is highly sensitive to wind direction inasmuch as reliance is placed upon a servomechanism to move the direction sensor to a null position rather than upon the force of the wind to move a wind vane. The servo system removes dependence upon the smooth bearings that are needed for precision of the conventional wind driven vane. Where there is sufficient wind to produce a difference between the elements of the dual element sensor, the servo system of the invention can be made to supply the motive power to move the sensor to the null position. The sensitivity of the invention, therefore, depends in part upon the construction of the dual element sensor and the invention is capable of responding to air movement of such low velocity that the conventional wind driven system is insensitive to it.

The invention, both as to its construction and mode of operation, can be better understood from the following exposition when it is considered in conjunction with the accompanying drawings in which:

FIG. 1 is a symbolic depiction of the scheme of the invention.

FIG. 1A depicts the cross-section of the dual element sensor;

FIG. 2 is a polar plot showing the response of a dual element sensor;

Figure 3:
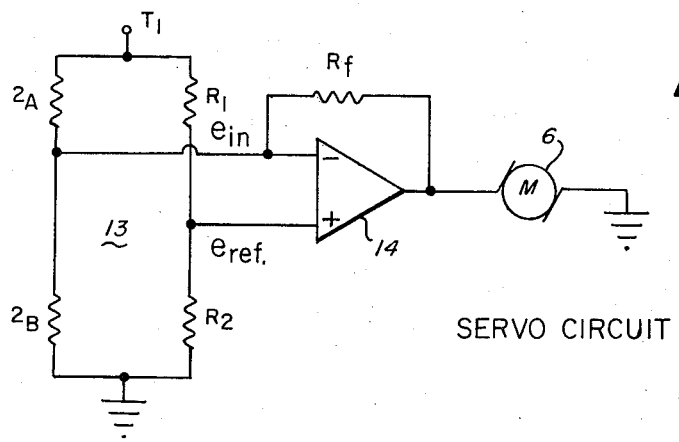
Figure 4:
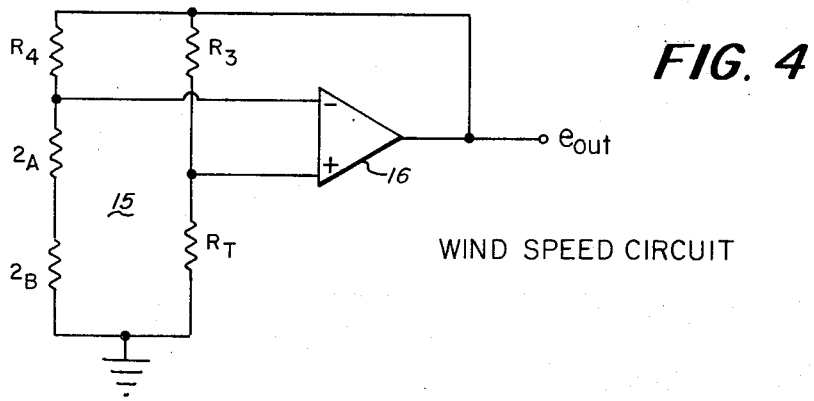
Figure 5:
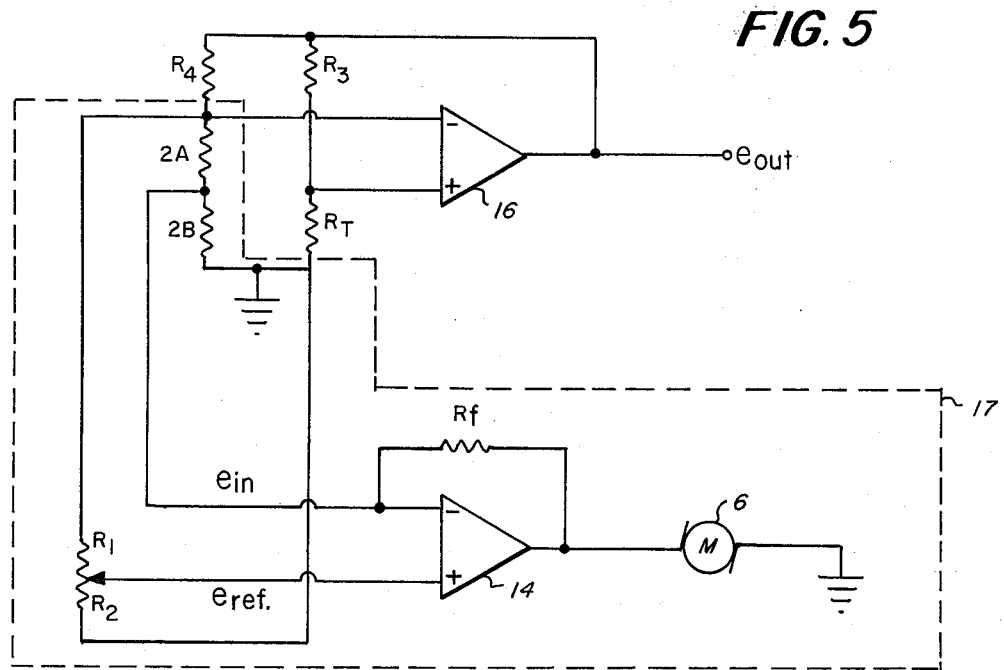
Figure 6:
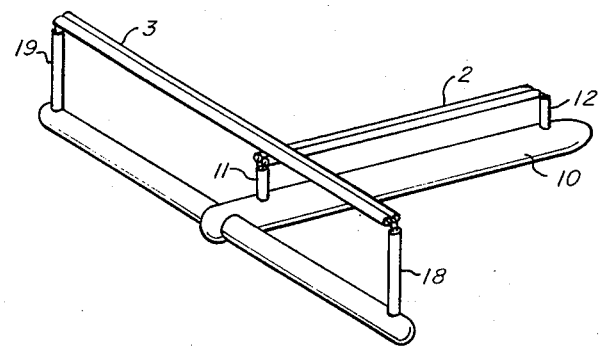
Figure 7:
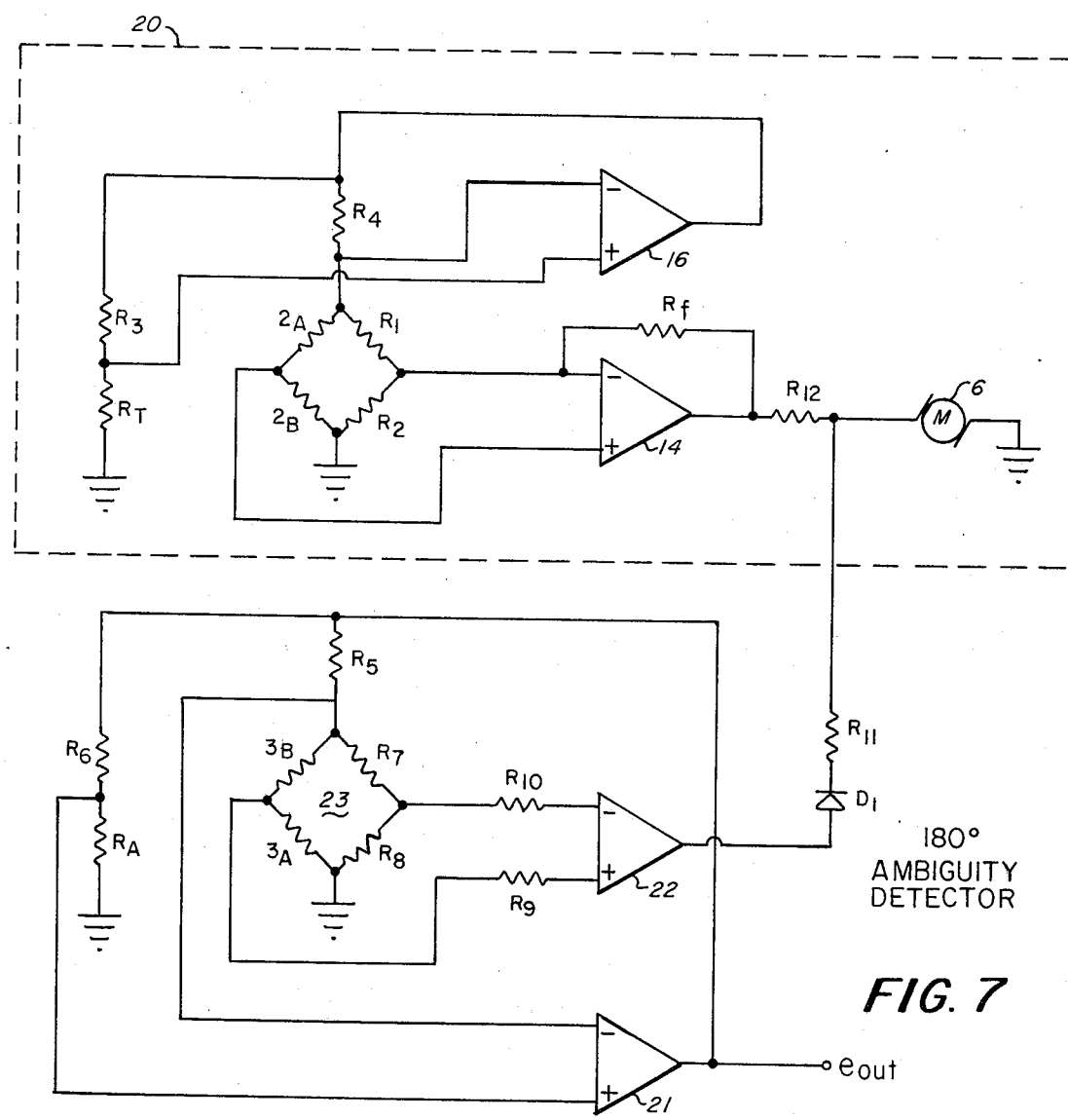

FIG. 3 schematically depicts a servo circuit suitable for use in the invention;

FIG. 4 shows the scheme of a circuit for obtaining wind speed from a dual element sensor;

FIG. 5 schematically depicts an arrangement in which a single dual element sensor is used both for servoing purposes and to provide a measure of wind speed;

FIG. 6 shows a modification of the invention in which a separate dual element sensor is employed to measure wind speed and to eliminate 180° ambiguity;

FIG. 7 schematically depicts an electronic circuit utilizing the two dual element sensor arrangement of FIG. 6;

FIG. 8 depicts an arrangement in which a single element wind speed sensor is employed;

FIG. 9 shows an arrangement for ascertaining the wind direction in elevation as well as in azimuth; and FIG. 9A is a cross-sectional view showing the disposition of the direction sensing elements.

A simple embodiment of the invention is schematically depicted in FIG. 1 where a hollow vertical mast 1 is shown supporting a dual element wind direction sensor 2. The mast 1 is secured to a gear 4 which is in engagement with a pinion 5 attached to the shaft of a motor 6. Actuation of motor 6 is governed by a controller 7 which receives input signals from the wind direction sensor 2. The controller can cause the motor's shaft to rotate in either direction to turn the mast in the direction required to bring the sensor 2 to a null position. A shaft position transmitter 8 may be a conventional synchro transmitter whose output is fed to a repeater 9 that is arranged to directly indicate wind direction.

The dual element sensor may be a pair of fine platinum or tungsten wires arranged side by side as shown in FIG. 1A with the gap between them filled by an electrically insulative material such as silica. Preferably the filler has poor heat transmission characteristics and acts as a heat barrier between the wires. Alternatively, the dual element sensor may utilize a thin film element such as is produced by coating a thin film of platinum over a tubular ceramic substrate. In the thin film construction the gap between the elements is filled to prevent air from flowing through the gap and to inhibit heat transfer from one element to the other. The dual element sensor is mounted on an elongate support 10 whose aerodynamic configuration minimizes perturbation of the flowing air stream. The dual element sensor 2 is elevated above the support 10 by stand-off posts 11 and 12. Electrical connections from the heated elements of the dual element sensor extend down through the stand-off posts into the support 10, and are brought out through the hollow mast 1.

FIG. 2 is a polar plot of the differential output from a dual element sensor obtained by rotating the dual element sensor through 360° while the wind velocity was maintained constant. The differential voltage is plotted radially with zero voltage being at the center. At 0°, the wind direction was directly along the longitudinal axis of the dual element sensor and the outputs from the two elements were balanced to eliminate any difference signal. The dual element sensor was rotated counterclockwise as viewed in inset FIG. 2A. The differential voltage output increased to a maximum when the wind direction was transversely across the dual element sensor. Further turning of the dual element sensor caused the differential signal to drop to zero at 180° rotation because the wind was again directly along the longitudinal axis of the sensor. Turning the dual element sensor beyond the 180° degrees caused a reversal in the polarity of the differential signal; otherwise, the response was nearly identical to that obtained for the first 180° rotation. With an ideal dual element sensor, the plot would show true circles touching at the zero voltage point. The extent to which the plot departs from a circle is a measure of the departure from a true sine response. Similar plots were obtained for a number of different wind velocities, the only substantial difference being in the diameter of the circle. In every case, the plot went through zero volts when the wind was directly along the longitudinal axis of the dual element sensor. A slight departure in the angle of ventilation from off the longitudinal axis results in a large change in the differential signal. The zero voltage point does not mean that the output signal from each element of the sensor is zero but only that the two elements are similarly ventilated. The zero voltage is a differential voltage obtained by comparing the signals from the two elements.

In the invention, the differential signal obtained from the dual element sensor 2 is employed in the servo system to position that sensor so that the wind is always directed along the sensor's longitudinal axis. The position of the dual element sensor 2 is, in effect, transmitted by shaft position transmitter 8 to the repeater 9 which indicates the wind direction. Dependence on the sine response of the dual element sensor is not necessary for all that is essential is that the sensor provide a signal which indicates the direction in which the mast must be turned to obtain a null position where the wind direction relative to the sensor is known and that the signal decrease in magnitude as the null position is approached. FIG. 3 schematically depicts a "servo" circuit that can be employed to turn the shaft 1 to the position where the wind flows along the longitudinal axis of dual element sensor 2. The two hot wire elements of sensor 2 are depicted in FIG. 3 as resistors 2A and 2B which form arms of a bridge 13. The other arms of the bridge are formed by resistors R1 and R2. The junction of resistors R1 and R2 is connected to the non-inverting input of an operational amplifier 14 to provide a reference signal $e_{ref}$. The inverting input of the amplifier obtains a signal $e_{in}$ from the junction of 2A and 2B. Part of the output of the amplifier is fed back to the inverting input through a feedback resistor $R_f$ and the portion not fed back is used to drive the motor 6. The motor 6 is of the reversible type and can be driven in either direction, depending upon the polarity of the output of amplifier 14.

The wind speed can be obtained from the dual element sensor 2 by employing the circuit schematically depicted in FIG. 4. In that circuit, elements 2A and 2B of the dual element sensor are in series and form one arm of a bridge 15. The other arms of the bridge are formed by resistors $R_3$, $R_4$, and a temperature compensating resistor $R_T$ which senses the ambient temperature. Resistor $R_T$ can be a thermistor or similar type of element whose resistance changes with temperature. The junction of $R_3$ and $R_T$ is connected to the non-inverting input of an amplifier 16 and the inverting input of the amplifier is connected to the junction of R4 and 2A. Amplifier 16 has a large gain and preferably is of type known as an "amplifier". The output of amplifier 16 powers bridge 15. In the arrangement depicted in FIG. 4, the large gain of the amplifier acts to maintain elements 2A and 2B at a constant temperature above the ambient sensed by $R_T$. Assuming elements 2A, 2B and resistor $R_T$ have positive temperature coefficients of resistance, a rise in ambient temperature causes an increase in the resistance of $R_T$. If the balance of the bridge is thereby upset, amplifier 16 immediately acts to provide more current to the bridge to cause elements 2A and 2B to become hotter. As a corollary, a decrease in ambient temperature sensed by $R_T$ results in a lowering of heat in elements 2A and 2B because the amplifier acts to reduce the current to the bridge. Inasmuch as elements 2A and 2B are at a constant temperature above the ambient, the heat carried away from those elements by convection depends upon the speed of the wind blowing over the elements and the aspect which those elements present to the wind. Assuming the servo circuit causes the dual element sensor to always present the same aspect to the wind, the heat lost by convection then depends only upon the wind speed. Consequently, the output $e_{out}$ of amplifier 16 is a measure of wind speed.

FIG. 5 shows the wind speed circuit combined with servo circuit to utilize the single dual element sensor represented by resistor 2A and 2B. In that combined arrangement the servo circuit of FIG. 3 is designated by the broken line box 17. The motor 6 is caused by the servo circuit to turn the dual element sensor so that its longitudinal axis faces directly into the wind. When so positioned, the wind speed is given by the $e_{out}$ signal from amplifier 16.

The FIG. 3 servo circuit will cause the dual element sensor to be oriented so that the sensor's longitudinal axis is aligned with the wind's direction. However, 180° ambiguity can arise since, as can be deduced from FIG. 2, the sensor cannot distinguish between a 0° wind and a 180° wind. If the wind is blowing from the 180° direction, a slight shift in wind direction will cause the servo system to turn the sensor until it is at 0° with respect to the wind's direction. Only in highly unusual circumstances will the wind blow steadily without shifting its direction. Where the wind is of extremely low velocity, (i.e. less than 2 kilometers per hour) a slight shift in wind direction may not be sufficient to enable the servo system to respond and turn the sensor into its proper position. Consequently, meteorological conditions can exist where the FIG. 3 servo circuit will be unable to resolve the 180° ambiguity.

For applications where precision is not paramount, the simple arrangement shown in FIGS. 1 and 5 in which a single dual element sensor is employed for both servoing purposes and wind speed measurement is adequate. However, in those applications where precision and fast response to changes in wind direction or wind speed are prime considerations, it is preferred to employ a separate sensor to measure the wind speed.

The wind speed sensor 3, as depicted in FIG. 6, is disposed to the rear of direction sensor 2 and is elevated above sensor 2 by posts 18, 19 which extend from support 10. The sensor 3 is thus disposed where it is unaffected by the turbulence or perturbation produced by sensor 2. In the FIG. 6 embodiment, the wind speed sensor 3 is of the dual element type and can be similar to dual element sensor 2. Wind speed sensor 3 performs two functions in the system of FIG. 7. Its primary function is to provide a signal which is a measure of the wind's speed. Its secondary function is to prevent ambiguity from arising out of the inability of direction sensor 2 to discern between wind blowing in 180° opposite directions along its longitudinal axis inasmuch as the difference signal is zero for both directions. The wind speed sensor 3 is disposed so that its longitudinal axis is at right angles with respect to the longitudinal axis of sensor 2. Thus, when the wind is directed along the longitudinal axis of sensor 2, the winds blows transversely acoss speed sensor 3. In the null position, wind speed sensor 3 always presents the same aspect to the wind. In the null position, the wind blows directly across wind speed sensor 3 so that the forward element is ventilated more than the rear element. The forward element therefore gives off more heat to the passing fluid than does the rear element and results in an electrical differential signal. Where the wind blows across sensor 3 in the 180° opposite direction, the differential signal voltage changes polarity. Thus the polarity of the differential signal indicates whether the ventilation angle of sensor 2 is 0° or 180° inasmuch as the signal voltage is positive for one direction and negative for the opposite direction. The magnitude of the differential voltage is a measure of wind speed and the polarity of the differential voltage indicates from which hemisphere the wind is blowing.

FIG. 7 is a schematic diagram of electronic circuitry that can be employed in the controller 7 of FIG. 1 to utilize the sensors 2 and 3 of FIG. 6. The circuitry in FIG. 7 within block 20 is essentially the same circuit shown in FIG. 5. In the FIG. 7 arrangement, however, the output of amplifier 16 is not used for the wind speed measurement. Instead the wind speed measurement is obtained from the output of an amplifier 21 which obtains its inputs from a bridge having one arm formed by elements 3A and 3B of dual element sensor 3 and having its three other arms formed by resistors R5, R6, and a temperature compensating resistor $R_A$ that senses the ambient temperature. The circuit for obtaining the wind speed in FIG. 7 is substantially the same circuit shown in FIG. 4 except that elements 3A and 3B of sensor 3 are used in the bridge in place of elements 2A and 2B.

In FIG. 7, amplifier 22 and bridge 23 form a 180° ambiguity detector. Bridge 23 has four arms formed by elements 3A and 3B of sensor 3 and by resistors R7 and R8. The non-inverting input of amplifier 22 is connected to the junction of 3A and 3B through resistor $R_9$. The inverting input of that amplifier is coupled by resistor $R_{10}$ to the junction of R7 and R8. The bridge is powered by the output of amplifier 21.

Amplifier 22 is a "comparator" amplifier and, consequently, its output saturates in one direction or the other depending upon the signals applied to its inputs. Where the sensor 3 of FIG. 6 is oriented so that wind blows from the front, the output of amplifier 22 applies a high negative signal to the anode of diode D1 which causes that diode to be held in its non-conductive state. With diode D1 reversely biased, the motor 6 is controlled entirely by the output of amplifier 14. Where the sensor is oriented so that the wind blows from the opposite direction, the output of amplifier 22 emits diode D1 into conduction and causes motor 6 to turn the sensor toward its proper position with respect to the wind direction. Resistor R11 limits the current supplied by amplifier 22 to the motor and resistor R12 acts as a buffer when diode D1 is biased into conduction. It is evident, therefore, that the 180° ambiguity detector will act quickly to swing the sensor into its proper position to orient sensor 2 so that the wind blows from the front along that sensor's longitudinal axis. The ambiguity detector is sensitive enough to act at low wind speeds inasmuch as the wind blows transversely across sensor 3 when 180° ambiguity occurs.

The two functions performed by the velocity sensor 3 in the FIG. 6 embodiment of the invention can be performed by separate sensors arranged as indicated in FIG. 8. In this arrangement, the dual element sensor 3 is disposed between posts 25, 26 and that sensor is employed solely to prevent 180° ambiguity. Wind speed is obtained from a single element sensor 27 mounted atop posts 25, 26. The arrangement is less sensitive to winds having a vertical component. Consider, for example, wind blowing in the direction indicated in FIG. 8 by arrow 28 in the vertical plane E. Inasmuch as that wind is directed downardly along the longitudinal axis of dual element sensor 2, both elements of the sensor are equally ventilated and the difference signal is zero. Consider now a wind blowing horizontally in the direction indicated by arrow 29 which is directly along the longitudinal axis of sensor 2 but has no downward or upward component. The horizontal wind also ventilates both elements of the sensor equally so that the difference signal is zero. The sensor 27 being a thin wire of circular cross-section, presents the same aspect to the wind proceeding from the direction of arrow 28 as it does to the wind from the direction of arrow 29. Thus the single element sensor 27 is not affected by the direction of the wind so long as sensor 2 is in its null position. The dual element sensor 3 however, presents a different aspect to a wind proceeding in the direction of arrow 28 than it does to a wind proceeding from the direction of arrow 29 and the magnitude of its differential output is consequently affected. Thus, the arrangement of FIG. 8 is preferred where accuracy in measuring wind speed is paramount and the wind is not confined to the horizontal. Inasmuch as the single element sensor 27 always presents the same aspect to the wind, temperature compensation of that element over the entire range of its use is relatively simple because no dependence is placed on the cosine response of the element.

The invention can be embodied in a system which ascertains wind direction in elevation as well as in azimuth. In such a system the support 10 is mounted, as shown in FIG. 9, to pivot in the yoke 30. In addition to sensors 2 and 3, a third dual element sensor 31 is mounted on the support 10 parallel to dual element sensor 2. However, as indicated by the cross-sectional view of FIG. 9A, the two elements 2A, 2B of sensor 2 are side by side in the horizontal plane whereas the two elements 31A, 32B of sensor 31 are side by side in the vertical plane. A motor 32 is provided on the yoke to tilt the support 10 in elevation. The motor 32 is controlled by a servo system whose output is provided by the sensor 31 to a vertical controller 33. The vertical servo system is essentially similar to the previously described asimuthal servo system. The vertical servo system causes support 10 to tilt until the wind is blowing directly along the longitudinal axis of sensor 21 while the horizontal servo system, concurrently, rotates the mast 1 until the wind is directly along the horizontal axis of sensor 2. The wind direction is thus ascertained in elevation as well as azimuth.

I claim:
1. Apparatus for ascertaining wind direction comprising
   1. a rotatable support,
   2. a first dual element sensor carried by the rotatable support in a manner exposing the dual element sensor to the wind, the first dual element sensor having a pair of closely spaced, elongate, temperature sensitive elements whose electrical resistance is a function of temperature, the pair of elements extending side by side along the sensor's longitudinal axis whereby both elements present the same aspect to the wind when the wind's direction is directly along the sensor's longitudinal axis and the elements present different aspects when the wind is off-axis,
   3. means for heating the temperature sensitive elements above the ambient temperature,
   4. a motor arranged to turn the rotatable support in the clockwise and counterclockwise directions, and
   5. means responsive to electrical signals obtained from the pair of temperature sensitive elements for causing the motor to turn the rotatable support to the position where the wind direction is along the longitudinal axis of the sensor.
2. Apparatus according to claim 1 for ascertaining wind direction, further including
   6. means for deriving an indication of wind speed from the means for heating the temperature sensitive elements above the ambient temperature.
3. Apparatus according to claim 1 for asertaining wind direction, further including
   6. a second dual element sensor mounted on the rotatable support, the longitudinal axis of the second dual element sensor being perpendicular to the longitudinal axis of the first dual element sensor, the second dual element sensor having a first elongate temperature sensitive element extending parallel with a second elongate temperature sensitive element along the sensor's longitudinal axis, the elements of the second dual element sensor being arranged to produce a differential voltage of one polarity when the wind is in one direction along the longitudinal axis of the first dual element sensor and to produce a differential voltage of the opposite polarity when the wind is in the opposite direction along that longitudinal axis,
   7. means for heating the elements of the second dual element sensor above the ambient temperature, and
   8. ambiguity detection means coupled to the elements of the second dual element sensor, the ambiguity detection means causing the motor to turn the rotatable support in response to the differential voltage of opposite polarity.
4. Apparatus according to claim 3, the apparatus including
   9. wind speed measuring means employing at least one element of the second dual element sensor to provide an indication of the amount of heat carried off by convection.

* * * * *